United States Patent
Schmidt

[11] 3,720,243
[45] March 13, 1973

[54] CONTOUR-COPYING APPARATUS

[75] Inventor: Erich Schmidt, Vienna, Austria

[73] Assignee: Maschinefabrik Zuckermann Komm. Bes., Vienna, Austria

[22] Filed: June 21, 1971

[21] Appl. No.: 154,791

[30] Foreign Application Priority Data
July 8, 1970  Austria.....................A 6184/70

[52] U.S. Cl. .............................142/7, 142/3, 90/13.4
[51] Int. Cl. ................................................B23b 3/28
[58] Field of Search .....142/7, 13, 11, 15, 3; 90/13.4, 90/13.7

[56] References Cited

UNITED STATES PATENTS

| 1,375,326 | 4/1921 | Schwarz | 142/13 |
| 1,363,238 | 12/1920 | Duchemin | 142/7 |
| 2,370,032 | 2/1945 | Groen | 90/13.4 |

*Primary Examiner*—Leonidas Vlachos
*Attorney*—Karl F. Ross

[57] ABSTRACT

A contour-copying apparatus has a lathelike arrangement for turning at least one workpiece and a model or pattern about parallel axes. A carriage on which is pivotally mounted a support having an arm arranged above each of the turning bodies is displaceable along the bodies in the direction of their rotation axes. Journaled in each arm is a longitudinally fixed but rotatable spindle with the spindle over the model carrying a feeler and the arm over the workpiece carrying a cutting tool. The tool-carrying arm or arms has on its other end a driven pulley overy which is spanned a V-belt also engaged over a drive pulley on a motor mounted on the carriage. The V-belt engages the driven pulley over a contact arc, and the support is pivotal on the carriage about an axis which lies in a plane defined by this arc while extending orthogonally to the body axes and through the belt. Thus, only the weight of the spindle and its arm is effective against the workpiece and model since the drive forces are applied directly and only at the pivot axis.

8 Claims, 3 Drawing Figures

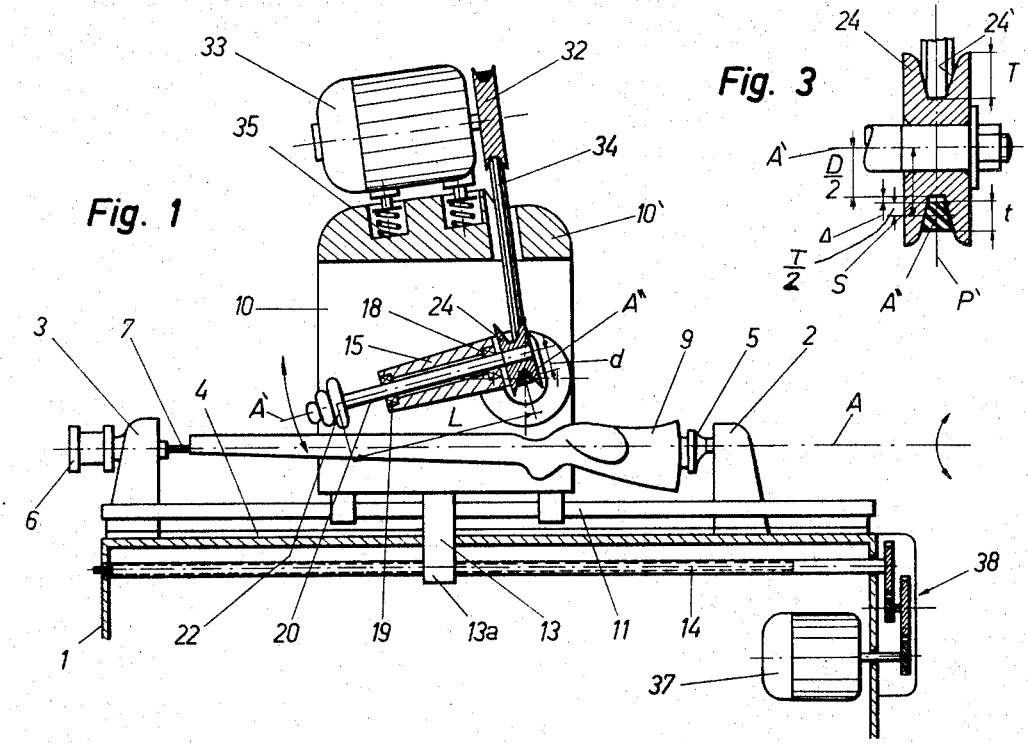
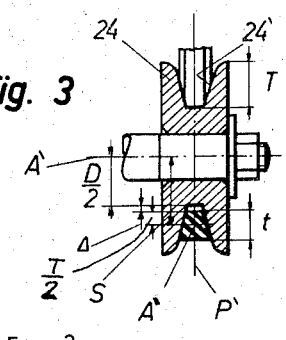
Fig. 1
Fig. 3
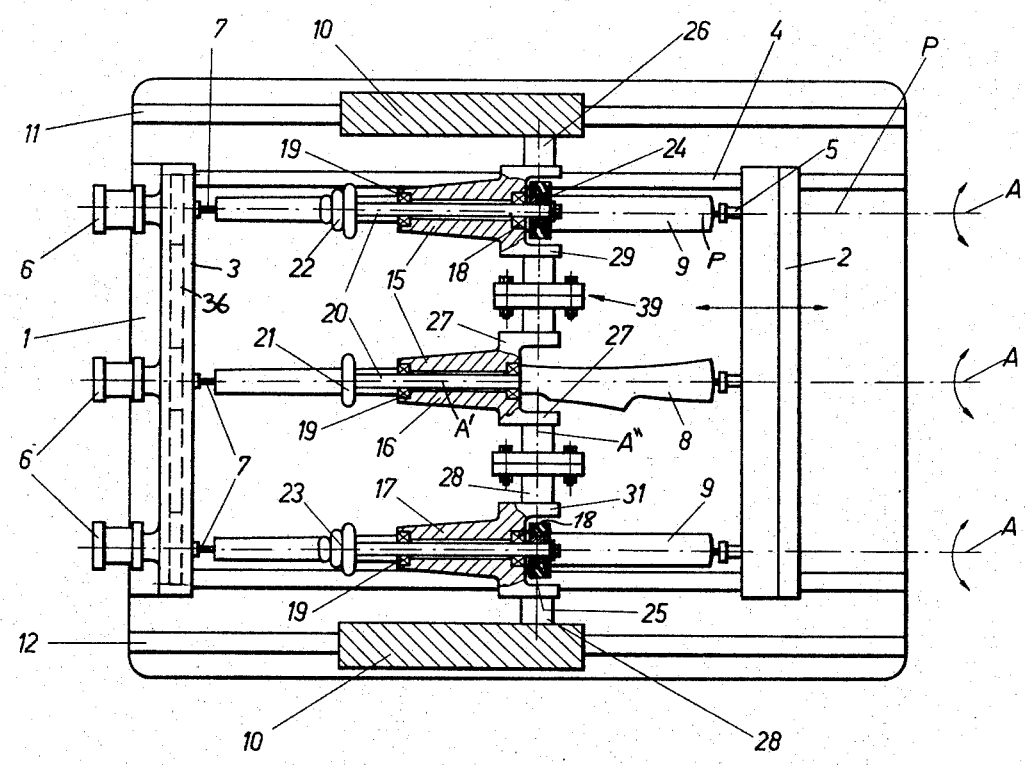
Fig. 2

CONTOUR-COPYING APPARATUS

FIELD OF THE INVENTION

This invention relates to an apparatus for copying the contours of a model. More specifically, this invention concerns such an apparatus useful for duplicating contoured objects in plastic, wood, or similar shapable material.

BACKGROUND OF THE INVENTION

Contour-copying machines are often used in the production of furniture, gun stocks, certain kinds of mass-produced sculpture and many other articles too numerous to mention. They usually consist of a feeler which is passed over a model or pattern and which is linked to a tool that is similarly passed over a blank or workpiece to form an identically or geometrically similar contoured object. Generally speaking, both the workpiece and model are synchronously rotated while relative motion is effected between the workpiece and model on one side and the mechanically connected tools and feeler on the other.

In one such prior-art device, a two-arm support is provided which is pivotal about a vertical axis while the workpiece and model are rotated about respective parallel horizontal axes. The long arm of the support carries a transverse tool-carrying spindle for each workpiece and the short arm has a drive motor for each spindle, with the drive motor's rotation axis being normal (perpendicular) to the support arm and parallel to the spindle axis. A V-belt interconnects the motor and the spindle and a counterweight arrangement is used to at least balance the weight of the motor and to urge the tool against the workpiece. Such an apparatus has one enormous disadvantage: its great inertia requires that the copying be done at relatively low speed if true reproduction is to be obtained. The mass of the motor and that of the counterweight combine to make the device cumbersome.

In another known arrangement, the tool spindle pivots against the workpiece about an axis parallel to itself so that the motor can be mounted on a stationary machine part or on a traveling carriage. This spindle is connected to an intermediate shaft lying along the pivot axis so that belts can interconnect this shaft one one side to a nonpivotal drive motor and to the tool spindle on the other side. Even with this arrangement, however, complicated counterweights were necessary to urge the tool against the workpiece, and the overall inertia of the arm is so great that accurate copying cannot be carried out at high speeds.

OBJECTS OF THE INVENTION

It is, therefore, an object of the present invention to provide an improved contour-copying apparatus.

Another object is the provision of such an apparatus wherein the mass of the pivotal support for the copying tool and feeler is minimal.

SUMMARY OF THE INVENTION

The above objects are attained according to the present invention by an apparatus of the general type and for the purposes previously described, wherein the tool-carrying and feeler-carrying spindles extend parallel to each other above the workpieces and model, and pivot about a common horizontal axis normal (perpendicular) to the parallel axes of rotation of the workpieces and model. The tool-carrying spindles each carry at one end a cutting tool and at the other end a V-belt pulley. All of the pulleys are in line and the support pivot axis (i.e., the common axes of the arms receiving the spindle) passes through the belt in the pulley groove, as a chord of each pulley wholly within this groove. Thus, with the drive motor mounted above the support on the carriage, the pivot axis for the support relative to the carriage passes between the spindle axis and the workpiece through the belt-pulley contact arc at just the point where the principal amount of force transfer from the belt to the pulley takes place.

Such pivoting can take place with slight deformation of the belt, and with the belt offering virtually no resistance to the pivotal movement according to the pulley design featured by my invention. Even if the belt is spanned tightly, the pivotal action of the support is virtually unaffected because the point of application of this force coincides with its pivot axis. The support arms which carry the spindles can thus be relatively light, and no counterweights are needed to bias the tool against the workpiece and the feeler against the model—the weight of the support and spindles with their tools and feeler alone suffices. Since this weight is slight, the support can follow relatively irregular contours readily, even with the workpieces and model rotated at high speeds and the carriage advanced relatively rapidly along these bodies in the direction of their rotation axes.

According to the invention, therefore, the common horizontal axis of all of the spindle-carrying arms (or the respective horizontal axis of each such arm) is spaced from the workpiece or pattern and lies in the plane of the pulley driving the spindle (i.e., the driven-pulley plane). Furthermore, this horizontal axis is spaced from the respective spindle axes by a distance equal to the radial distance of the centerline of the individual drive belts from its pulley center at the center of the arc about which it is slung along the pulley groove. Where a V-belt pulley is used and a single groove is provided, the driven-pulley plane is the median plane between the flanks of the groove and passing through the center of the belt body. Hence, if each driven pulley has a groove of root diameter D, the V-belt pulley has a thickness in the driven-pulley plane of T, and the inner face of the belt rests against the root of the groove, the radial distance S of the center of the belt and the horizontal axis in the driven-pulley plane from the spindle axis is given by: $S = (D+T)/2$. Where the inner surface of the belt is held a radial distance $\Delta$ away from the floor of the groove, the relationship becomes: $S = (D+T)/2 + \Delta$.

DESCRIPTION OF THE DRAWING

The above and other objects, features and advantages will become apparent from the following description, reference being made to the accompanying drawing in which:

FIG. 1 is a side sectional view of the apparatus according to the present invention;

FIG. 2 is a top view, partly in section, showing the apparatus of FIG. 1; and

FIG. 3 is a medial section through a detail of the present invention in enlarged scale.

SPECIFIC DESCRIPTION

The apparatus, according to my present invention, has a machine frame 1 on which a tailstock 2 carrying three dead centers 5 slides in a pair of grooves 4. Facing the tailstock 2 is a live headstock 3 having centers 7 operated by pneumatic cylinders 6 and driven by a gear arrangement 36 so that the two outer centers turn in opposite directions and the middle center turns, as seen in FIG. 2, in the same direction as the lower center. A gunstock model 8 of wood is spanned between the middle centers and a pair of wood blanks 9 are spanned to each side of it. All turn about parallel and coplanar respective axes A. Of course, any other horizontally aligned rotatable clamping devices known to the art may be used to clamp the workpiece and pattern between them.

Slidable on rods 11 and 12 on the table 1 are a pair of carriage halves 10, with a pair of depending lugs 13 formed with threaded bores 13a in which a leadscrew 14 is engaged. A motor 37 is connected through gears 38 to the leadscrews 14 to move the carriages 10 back and forth in the direction of axes A. Pneumatic or hydraulic axial displacement means may also be used.

Spanned between the carriages 10 is a support 39 comprising three parallel arms 15, 16, and 17 connected to each other by respective coaxial axle necks 26, 27 and 28 mounted on cheeks 29, 30 and 31. Held by bearings 18 and 19 in each arm is a spindle which extends longitudinally through the center of the arm and is rotatable in the bearings 18 and 19 about an axis A' and pivotal in a vertical plane P including the axes A and A' while these bearings prevent axial movement of the spindles relative to their support arms. The spindle 20 of the center arm 16 carries on one end a feeler or follower roller 21 adapted to roll on the model 8 and the two other spindles carry on their corresponding ends three-part cutting heads 22 and 23, such as fine-toothed milling heads or other tools (see U.S. Pat. No. 3,496,685). The tool and feeler elements 21, 22 and 23 are in line normal to the axes A and A'.

The two spindles 20 carrying the shaping heads 22 and 23 have on their opposite ends respective V-belt pulleys 24 and 25 each connected via a V-belt 34 and a pulley 32 to a motor 33 resiliently mounted on springs 35 on a traverse 10' extending between the two carriages 10. As shown in FIG. 3, the pulley 24, which is identical with the pulley 25, has a circumferential V-groove 24' whose upper edges are rounded so that the belt is not likely to ride out of it. This groove 24' lies on a central plane P' normal to the axis A' and has a depth T substantially greater than the thickness t of the belt once again to ensure that the belt remains in the groove. It can be seen that the axis A' passes as a chord through the groove 24' and tangent to a centerline of the V-belt so that the force is delivered just at the spindle rotation axis, thereby remaining unaffected by the angular position of the spindle and similarly having no effect on such angular position, in spite of the belt-tensioning springs 35. In addition, the length L of the spindle 20 between its tool 22 or 23 and its pulley 24 is at least three times the distance $d$ between the axes A' and A''. Advantageously, it is eight times this distance $d$ so that the tool 22 or 23 attacks its workpiece at the most advantageous angle. In one embodiment a workpiece 9 having a high-point/ low-point difference in size of 2.5 inches was easily worked at high speed.

In operation, a model 8, here a right-hand gunstock of wood, is spanned between the middle pair of centers 7 and 5 and a pair of workpieces 9, here rectangular bars of walnut, are spanned to each side of it. The drive 36 is actuated to rotate all the centers 7 at the same speed, with the model 8 and one blank 9 rotating in one direction and the other blank 9 in the opposite direction. The carriage 10, 10' is withdrawn to one end and the motors 32 and 37 are started. The weight of the arms 15–17 alone holds the tools 22 and 23 in contact with the blanks 9 and the feeler 21 in contact with the model 8. Since this feeler 21 is only a roller, it guides the tools 22 and 23 so that they cut the blanks into the very same shape as the model. In this case, one right-handed and one left-handed gunstock will be produced due to the opposite turning directions. Should the amount of material removal required to arrive at the desired contours be excessive, the blanks can be shaped in several passes of the tools 22 and 23. It is also possible to replace the cutter heads 22 and 23 with polishing or burnishing tools for a final buffing.

I claim:

1. A contour-copying apparatus comprising:
means for synchronously rotating a model body and a workpiece body about respective parallel rotation axes;
a carriage displaceable along said bodies in the direction of said axes;
a support pivotally mounted on said carriage;
a pair of elongated spindles longitudinally fixed and rotatably mounted on said support, one of said spindles carrying on one end a model-engaging feeler element, the other spindle carrying on its corresponding one end a workpiece-engaging tool element;
a driven pulley operatively connected to the other end of said other spindle and formed with an annular circumferential groove;
a pivot between said support and said carriage having a pivot axis extending transverse to said rotation axes and as a chord wholly within said groove; and
a drive including a motor mounted on said carriage, a drive pulley carried by said motor, and a belt spanned over said drive pulley and over said driven pulley in said groove.

2. The apparatus defined in claim 1 wherein said spindles are disposed in a vertical plane including said rotation axes.

3. The apparatus defined in claim 2 wherein said driven pulley is mounted directly on said other spindle and said pivot axis lies between said other spindle and said workpiece body.

4. The apparatus defined in claim 3 wherein the length of said other spindle between said tool element and said driven pulley is equal to at least several times the distance between said spindle and said pivot axis.

5. The apparatus defined in claim 4 wherein said pivot axis is tangent to a centerline of said belt.

6. The apparatus defined in claim 4 wherein said support has a pair of arms respectively carrying said spindles.

7. The apparatus defined in claim 4 wherein said apparatus comprises a pair of such other spindles each carrying such a tool element, all said spindles being rotatable about coplanar axes.

8. The apparatus defined in claim 4 wherein said pivot axis is orthogonal to said rotation axes.

* * * * *